(12) United States Patent
Iijima

(10) Patent No.: US 7,518,805 B2
(45) Date of Patent: Apr. 14, 2009

(54) ZOOM LENS SYSTEM

(75) Inventor: Kenji Iijima, Suwa (JP)

(73) Assignee: Nittoh Kogaku K.K., Suwa-Shi, Nagano (JP)

( * ) Notice: Subject to any disclaimer, the term of this patent is extended or adjusted under 35 U.S.C. 154(b) by 223 days.

(21) Appl. No.: 11/689,792

(22) Filed: Mar. 22, 2007

(65) Prior Publication Data
US 2007/0223108 A1    Sep. 27, 2007

(30) Foreign Application Priority Data
Mar. 23, 2006    (JP) .............................. 2006-081271

(51) Int. Cl.
*G02B 15/14* (2006.01)
(52) U.S. Cl. ...................... 359/684; 359/683
(58) Field of Classification Search ................. 359/676, 359/684, 683
See application file for complete search history.

(56) References Cited
U.S. PATENT DOCUMENTS 6,718,132 B2 * 4/2004 Nishina ........................ 396/72
6,721,105 B2 * 4/2004 Ohtake et al. ............... 359/676
7,092,169 B1 * 8/2006 Chang ......................... 359/683
2006/0139764 A1 * 6/2006 Miyazawa .................. 359/676
2008/0019017 A1 * 1/2008 Nishina ...................... 359/684

FOREIGN PATENT DOCUMENTS

JP            04-078809          3/1992

* cited by examiner

Primary Examiner—Scott J Sugarman
(74) Attorney, Agent, or Firm—Thompson Hine LLP

(57) ABSTRACT

A zoom lens system that has five lens groups with respectively positive, negative, positive, positive, and positive refractive powers in that order from an object side to an image forming side is provided. The third lens group consists, in order from the object side, of a first positive lens, a negative lens, and a second positive lens, the first positive lens and the negative lens composing a cemented lens. The fourth lens group consists, in order from the object side, of a first positive lens, a negative lens, and a second positive lens, the negative lens and the second positive lens composing a cemented lens. In the zoom lens system, zooming (operation) between a wide-angle end and a telephoto end is carried out without moving the first lens group and the fifth lens group, and focusing is carried out by moving the fifth lens group.

6 Claims, 3 Drawing Sheets

Fig. 2

| No | r | d | nd | νd | |
|---|---|---|---|---|---|
| 1 | 56.3404 | 1.5 | 1.84666 | 23.8 | L11 }CL1 |
| 2 | 30.7876 | 4.4 | 1.77250 | 49.6 | L12 |
| 3 | 128.0102 | 0.2 | | | |
| 4 | 25.6897 | 2.8 | 1.77250 | 49.6 | L13 |
| 5 | 41.9947 | (d5) | | | |
| 6 | 31.4297 | 0.8 | 1.88300 | 40.8 | L21 |
| 7 | 6.8418 | 3.1 | | | |
| 8 | 110.4013 (AS) | 0.8 | 1.83400 | 37.3 | L22 |
| 9 | 9.8781 | 3.3 | | | |
| 10 | −8.9877 | 0.8 | 1.58144 | 40.9 | L23 }CL2 |
| 11 | 18.0374 | 3.3 | 1.84666 | 23.8 | L24 |
| 12 | −17.7523 | (d12) | | | |
| 13 | Flat | 0.5 | | | stop S |
| 14 | 13.3722 | 2.6 | 1.56883 | 56.0 | L31 }CL3 |
| 15 | −8.3270 | 0.7 | 1.83400 | 37.3 | L32 |
| 16 | −49.0190 | 1.5 | | | |
| 17 | −9.1681 (AS) | 2.5 | 1.51680 | 64.2 | L33 |
| 18 | −6.5594 | (d18) | | | |
| 19 | 11.1857 | 2.7 | 1.77250 | 49.6 | L41 |
| 20 | 46.8805 | 0.6 | | | |
| 21 | −31.8424 | 0.7 | 1.80610 | 33.3 | L42 }CL4 |
| 22 | 8.6993 | 2.7 | 1.51680 | 64.2 | L43 |
| 23 | −14.0393 | (d23) | | | |
| 24 | 9.3840 | 2.0 | 1.48749 | 70.4 | L51 |
| 25 | −9.9566 | 0.4 | | | |
| 26 | −8.8918 | 0.7 | 1.80518 | 25.5 | L52 |
| 27 | −34.0281 | 1.0 | | | |
| 28 | Flat | 0.5 | 1.51633 | 64.1 | OF1 |
| 29 | Flat | 1.0 | | | |
| 30 | Flat | 0.5 | 1.51633 | 64.1 | OF2 |
| 31 | Flat | 0.5 | | | |

ZOOM LENS SYSTEM

CROSS-REFERENCE TO RELATED APPLICATIONS

This application is based upon and claims the benefit of priority from the prior Japanese Patent Application No. 2006-81271, filed Mar. 23, 2006, the entire contents of which are incorporated herein by reference.

BACKGROUND

The present invention relates to a zoom lens system having high zoom ratio.

Japanese Laid-Open Patent Publication No. H04-78809 discloses a camera zoom lens that has five lens groups and a high zoom ratio of around six. In order from the object side to the image forming side, this zoom lens includes four groups with positive, negative, positive, and positive refractive powers, and a fifth lens group with a comparatively low refractive power. During zooming, the first, third and fifth groups are fixed, the second group moves in a certain direction to change the magnification, and the fourth group is moved forward and backward to correct variation in the image plane during zooming. In addition, focusing is carried out by moving the fourth group.

SUMMARY

For applications such as a digital video camera for video conferencing, there is demand for a compact zoom lens that has a high zoom ratio, is extremely wide angle, and still has a fairly large angle of field at the telephoto end.

A first aspect of the present invention is a zoom lens system including, in order from an object side thereof: a first lens group that has positive refractive power; a second lens group that has negative refractive power; a third lens group that has positive refractive power; a fourth lens group that has positive refractive power; and a fifth lens group that has positive refractive power. The third lens group consists, in order from the object side, of a first positive lens, a negative lens, and a second positive lens, the first positive lens and the negative lens composing a cemented lens. The fourth lens group consists, in order from the object side, of a first positive lens, a negative lens, and a second positive lens, the negative lens and the second positive lens composing a cemented lens. In the zoom lens system, zooming (operation) between a wide-angle end and a telephoto end is carried out without moving the first lens group and the fifth lens group, and focusing is carried out by moving the fifth lens group.

This zoom lens system has an arrangement of five lens groups with respectively positive, negative, positive, positive, and positive refractive powers in that order from the object side to the image forming side.

The third lens group consists, in order from the object side, of a cemented (balsam) lens and a positive lens. The cemented lens of the third lens group consists, in order from the object side, of a positive lens and a negative lens.

Contrary, the fourth lens group consists, in order from the image forming side, of a cemented (balsam) lens and a positive lens. The cemented lens of the forth lens group consists, in order from the image forming side, of a positive lens and a negative lens.

This symmetrical arrangement where the third lens group and the fourth lens group both have a positive lens on the inside and a cemented lens on the outside is advantageous in correcting aberration. In addition, cemented lens is advantageous for correcting aberration such as chromatic aberration but tends to the refractive power becomes low. Hence, by disposing the cemented lenses on the outsides of these groups, it is possible to bring the principal points of the third lens group and the fourth lens group closer together and it is possible to place the principal points of the third and fourth lens groups closer together during zooming, especially at the telephoto end. That is, in the arrangement of this zoom lens system, the cemented lenses are not existed between the third lens group and forth lens group, the cemented lenses becomes less factor for determining the distance between the principal point of the third lens group and that of the fourth lens group, therefore the distance between principal points of the groups can be minimized.

Also, by focusing the zoom lens system using the fifth lens group for internal focusing that has a simple, around the third lens group and the fourth lens group, extra space to move such lens groups for focusing the zoom lens system, the distance between such lens groups can be minimized.

By such arrangement of this zoom lens system where the distance between the principal points of the third lens group and the fourth lens group can be minimized, it becomes possible to increase the rate of change in the distance between the principal points of the third and fourth lens groups during zooming, which is advantageous in achieving a high zoom ratio. Accordingly, it is possible to provide a zoom lens system that is compact and has a high zoom ratio (i.e., high magnification varying ratio).

When zooming from the wide-angle end to the telephoto end, in this zoom lens system, it is preferable for the second lens group to move from the object side toward the image forming side, the third lens group to move from the image forming side toward the object side, and the fourth lens group to move from the image forming side toward the object side. Since the third lens group is not fixed during zooming and moves toward the object side, it is possible to achieve a wide angle at the telephoto end and to obtain an image of a desired size with relatively smaller aperture of the first lens group. During zooming from the wide-angle end to the telephoto end, in detail, the third lens group should preferably make a comparatively large move toward the object side and then slightly return toward the image forming side.

The second lens group should preferably include a negative meniscus lens that is convex on the object side thereof. The object side surface of the negative meniscus lens should preferably be aspherical and has a positive power (refractive power) that increases from an optical axis toward a periphery of the object side surface. This arrangement is effective in correcting negative distortion that increases at the wide-angle end.

The second positive lens (the positive lens located image forming side) of the third lens group should preferably be a positive meniscus lens that is concave on the object side thereof. The object side surface of the positive meniscus lens should preferably be aspherical and has a negative power (refractive power) that increases (the absolute value of power is increases) from the optical axis toward the periphery of the object side surface. This arrangement including the aspherical surface is effective in suppressing the occurrence of spherical aberration and coma aberration.

In addition, a combined focal length (focal distance) f2 of the second lens group and a combined focal length (focal distance) fw of the zoom lens system at the wide-angle end should preferably satisfy the following condition (1)

$$2 < |f2/fw| < 4 \qquad (1).$$

If the upper limit of condition (1) is exceeded, the refractive power of the second lens group is too weak relative to the entire zoom lens system, which makes it difficult to make the zoom lens system compact. On the other hand, below the lower limit of condition (1), the refractive power of the second lens group is too strong relative to the entire zoom lens system, which makes it difficult to correct aberration such as spherical aberration and coma aberration.

One of other aspects of the present invention is a camera including the zoom lens system described above and an image pickup device disposed on an image forming side of the zoom lens system. This zoom lens system has high magnification and a wide angle of field, and is suited to applications where an extremely wide angle of field and a telephoto function are required, such as a video conferencing camera, a videophone camera, or a monitoring camera.

BRIEF DESCRIPTION OF THE DRAWINGS

The accompanying drawings, which are incorporated in and constitute a part of the specification, illustrate embodiments of the invention, and together with the general description given above and the detailed description given below, serve to explain the principles of the invention.

FIG. 2 shows data on the respective lenses in the zoom lens system;

DETAILED DESCRIPTION

Figure 1A:
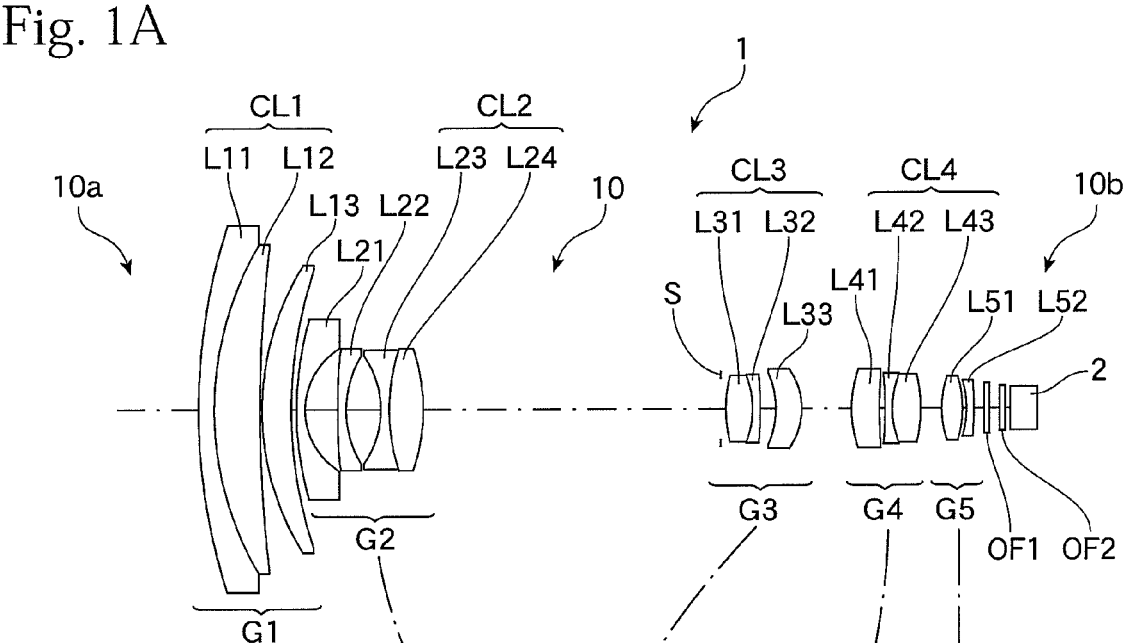
FIGS. 1A and 1B show the arrangements of a zoom lens system, with FIG. 1A showing the arrangement of lenses at the wide-angle end and FIG. 1B showing the arrangement of lenses at the telephoto end.
Figure 1B:
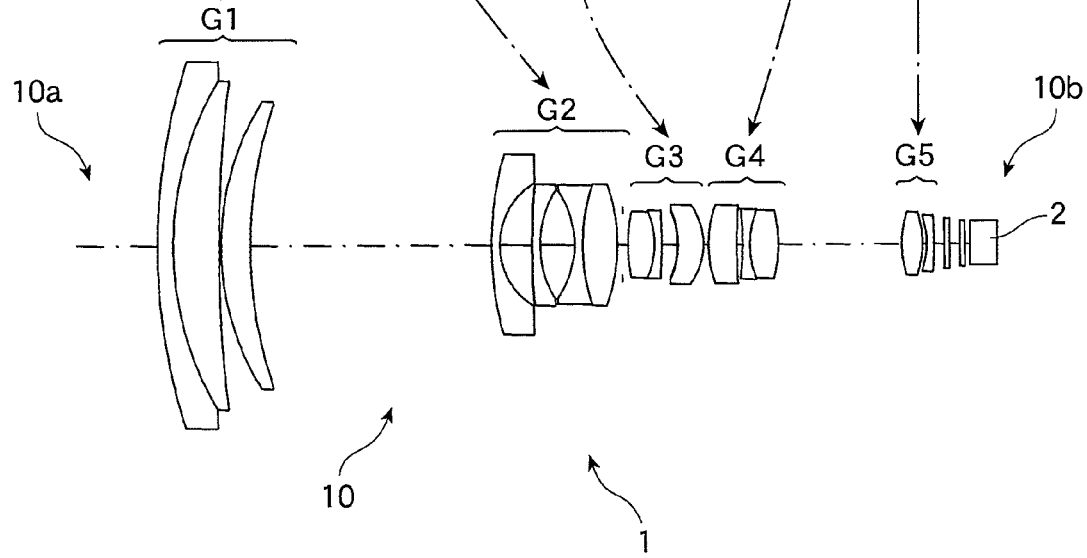

FIGS. 1A and 1B show the schematic arrangement of a camera 1 that is one of embodiments of the present invention. The camera 1 includes a zoom lens system 10 and an image pickup device 2 disposed on the image forming side 10b of the zoom lens system 10. The image pickup device 2 is a CCD or CMOS sensor or the like and can convert an image focused (formed) upon the image pickup device 2 to digital image data. The image data are displayed on a display device, printed or stored on a media, supplied to a host apparatus such as a personal computer and/or transferred via a computer network or a public telephone network to an external information processing apparatus.

FIG. 1A shows the arrangement of lenses at the wide angle-end of the zoom lens system 10. FIG. 1B shows the arrangement of lenses at the telephoto end. The zoom lens system 10 is composed of fifteen lenses numbered L11 to L13, L21 to L24, L31 to L33, L41 to L43, and L51 to L52 divided into five lens groups numbered G1 to G5 in that order from the object side (subject side) 10a to the image forming (image plane) side 10b of the zoom lens system 10. These five lens groups G1 to G5 respectively have positive, negative, positive, positive, and positive refractive powers in that order from the object side 10a. The zoom lens system 10 is telecentric or almost telecentric at the image forming side 10b where the image pickup device 2 is provided, so that a sharp image can be produced on the image pickup device 2.

The first lens group G1 that is closest to the object side 10a has an overall positive refractive power and consist, in order from the object side 10a, of a negative meniscus lens L11 that is convex toward the object side, a positive meniscus lens L12 that is convex toward the object side, and a positive meniscus lens L13 that is convex toward the object side. The lenses L11 and L12 that are closest to the object side 10a compose a cemented lens (a balsam lens) CL1.

The second lens group G2 has an overall negative refractive power and consists, in order from the object side 10a, of a negative meniscus lens L21 that is convex toward the object side, another negative meniscus lens L22 that is also convex toward the object side, a biconcave negative lens L23, and a biconvex positive lens L24. The negative lens L23 and the positive lens L24 that are closest to the image forming side 10b compose a cemented lens CL2. The object side surface s8 of the second lens L22 is aspherical.

The third lens group G3 has an overall positive refractive power and consist, in order from the object side 10a, of a biconvex positive lens (first positive lens) L31, a negative meniscus lens L32 that is convex toward the image forming side, and a positive meniscus lens (second positive lens) L33 that is also convex toward the image forming side. The first positive lens L31 and the negative lens L32 that are closest to the object side 10a compose a cemented lens CL3. The object side surface s17 of the meniscus lens (second positive lens) L33 that is closest to the image forming side 10b is aspherical. A "stop" (aperture) S is located on the object side 10a of the third lens group G3 and moves together with the third lens group G3 during zooming.

The fourth lens group G4 has an overall positive refractive power and consists, in order from the object side 10a, of a positive meniscus lens (first positive lens) L41 that is convex on the object side, a negative biconcave lens L42, and a positive biconvex lens (second positive lens) L43. The negative lens L42 and positive lens (second positive lens) L43 that are closest to the image forming side 10b compose a cemented lens CL4.

The fifth lens group G5 that is closest to the image forming side 10b has an overall positive refractive power and consists, in order from the object side 10a, of a positive biconvex lens L51 and a negative meniscus lens L52 that is convex on the image forming side 10b. In addition, optical filters OF1 and OF2 are disposed between the zoom lens system 10 and the image pickup device 2.

As shown in FIGS. 1A and 1B, when zooming from the wide-angle end to the telephoto end, the first lens group G1 and the fifth lens group G5 of the zoom lens system 10 are fixed and the second lens group G2, the third lens group G3, and the fourth lens group G4 move so as to approach one another. Accordingly, zooming is carried out without moving the first lens group G1 and the fifth lens group G2. Therefore, during zooming, only the second lens group G2, the third lens group G3, and the fourth lens group G4 are driven by a lens driving mechanism. More specifically, when zooming from the wide-angle end to the telephoto end, the second lens group G2 moves from the object side 10a toward the image forming side 10b, the third lens group G3 moves from the image forming side 10b toward the object side 10a, and the fourth lens group G4 moves from the image forming side 10b toward the object side 10a. More detail, during zooming from the wide-angle end to the telephoto end, the third lens group G3 first makes a comparatively large move toward the object side 10a and then makes a smaller move toward the image forming side 10b.

The focus is adjusted after zooming by moving the fifth lens group G5 forward and/or backward.

FIG. 2 shows the lens data. In the lens data "r" represents the radius of curvature (mm) of each lens located in order from the object side, "d" represents the distance (mm) between the respective lens surfaces located in order from the object side, "nd" represents the refractive index (d line) of each lens in order from the object side, and "vd" represents the Abbe number (d line) of each lens in order from the object side. The expression "Flat" indicates a flat surface.

Since the stop S moves together with the third lens group G3 during zooming, the distance d5 between the first lens group G1 and the stop S, the distance d12 between the second lens group G2 and the third lens group G3, the distance d18 between the third lens group G3 and the fourth lens group G4, and the distance d23 between the fourth lens group G4 and the fifth lens group G5 all vary.

The surface s8 on the object side of the negative meniscus lens L22 that is in the second lens group G2 and is convex on the object side is aspherical. Also, the surface s17 on the object side of the positive meniscus lens L33 that is in the third lens group G3 and is concave on the object side is aspherical. The aspherical coefficients are as follows.

Surface s8

K=−5.0000

A=1.4915×10$^{-4}$, B=1.2312×10$^{-6}$

C=−6.9372×10$^{-8}$, D=5.7671×10$^{-10}$

The aspherical surfaces are expressed by the following expression using the coefficients K, A, B, C, and D given above with X (sag value) as the coordinate in the optical axis direction, Y as the coordinate in a direction perpendicular to the optical axis, the direction in which light propagates as positive. This is also the case hereinafter.

$$X=Y^2/R/[1+\{1-(1+K)Y^2/R^2\}^{1/2}]+AY^4+BY^6+CY^8+DY^{10}$$

Surface s17

K=0.0000

A=−4.6610×10$^{-4}$, B=−8.9834×10$^{-6}$

C=1.2559×10$^{-7}$, D=−1.2067×10$^{-8}$

Various values during zooming of the zoom lens system 10 are as follows.

|  | Wide angle | Medium | Telephoto |
| --- | --- | --- | --- |
| Focal length f | 2.0 | 8.0 | 14.0 |
| FNo | 2.00 | 2.36 | 2.47 |
| d5 | 0.5000 | 16.8739 | 23.0719 |
| d12 | 28.5500 | 5.3194 | 0.5000 |
| d18 | 4.7779 | 5.6762 | 0.5000 |
| d23 | 2.0000 | 7.9584 | 11.7560 |

Angle of field: 90.0° to 16.2°
Back focus: 0.5 mm
The focal length of the second lens group G2 f2: −5.845 mm
Condition(1)(|f2/fw|): 2.923

The zoom lens system 10 according to the present embodiment satisfies condition (1). In addition, the first lens group G1, the second lens group G2, the third lens group G3, and the fourth lens group G4 each include one cemented lens, i.e., the cemented lenses CL1, CL2, CL3, and CL4. The cemented lens CL1 of the first lens group G1 is located on the object side and the cemented lens CL2 of the second lens group G2 is located on the image forming side. This means that as shown in FIG. 1A, at the wide-angle end where the first lens group G1 and the second lens group G2 become closest together, the lenses, aside from the cemented lenses CL1 and CL2, of the lens groups G1 and G2 can be placed closer together.

The cemented lens CL3 of the third lens group G3 is located on the object side and the cemented lens CL4 of the fourth lens group G4 is located on the image forming side. This means that as shown in FIG. 1B, at the telephoto end where the third lens group G3 and the fourth lens group G4 become closest together, the lenses, aside from the cemented lenses CL3 and CL4, of the lens groups G3 and G4 can be placed closer together. Accordingly, it is possible to make the principal points of the third lens group G3 and the fourth lens group G4 closer together at the telephoto end, so that a zoom lens system 10 with a high zooming ratio (magnification varying ratio) of seven can be provided.

That is, the cemented lenses CL3 and CL4 are advantageous for correcting aberration such as chromatic aberration but have relatively weaker refractive power than the other lenses included in the groups. Therefore, the principal point of each group locates near or around the other lenses of the group. By adopting the arrangement of disposing the cemented lenses on the outsides of these groups G3 and G4, it is possible to bring the principal points of the third lens group and the fourth lens group closer together. At the telephoto, it is possible to place the principal points of the third and fourth lens groups closet together, hence, during zooming, variation of the distance between principal points of the groups becomes large that makes high zooming ratio.

In addition, although the zoom lens system is an internal focusing type, the fifth lens group G5 is moved forward and backward to adjust the focus and there is no need to move either the third lens group G3 or the fourth lens group G4 to adjust the focus. Accordingly, at the telephoto end, it is possible to minimize the distance between the third lens group G3 and the fourth lens group G4, the distance between the principal points can be minimized, and the change in the distance between the principal points during zooming can be maximized.

In addition, in the zoom lens system 10, the third lens group G3 is not fixed during zooming and moves toward the object side 10a from the wide-angle end to the telephoto end. This means that at the telephoto end and at an intermediate position between the telephoto end and the wide-angle end, it is possible to achieve a sufficiently wide angle without increasing the aperture (diameter) of the first lens group G1 or with relatively smaller diameter of the first lens group G1. Hence, the image pickup device 2 can have an image of a sufficient range even at the telephoto end.

The aspherical surface s8 is provided on the object side of the negative meniscus lens L22 in the second lens group G2 and the surface s8 is shaped convex on the object side so that the aspherical surface s8 has the positive refractive power while the lens L22 has negative refractive power. The positive refractive power of the aspherical surface s8 increases from the optical axis toward the periphery and the negative refractive power (absolute value of the power) of the lens L22 decreases from the optical axis toward the periphery. That is the sag value X of this surface is positive and the absolute value of X increases toward the periphery of the surface s8. This aspherical surface s8 is effective in correcting negative distortion that increases at the wide-angle end.

The aspherical surface s17 is provided on the object side of the positive meniscus lens L33 in the third lens group G3 and the surface s17 is shaped concave on the object side so that the aspherical surface 17 has negative refractive power while the lens L33 has the positive refractive power. The negative refractive power (absolute value of the power) of the aspherical surface s17 increases from the optical axis toward the periphery and the positive refractive power of the lens L33 decreases from the optical axis toward the periphery. That is the sag value X of this surface is negative and the absolute value of X increases toward the periphery of the surface s17.

This aspherical surface s17 is effective in suppressing the occurrence of spherical aberration and coma aberration.

In addition, the third lens group G3 and the fourth lens group G4 have symmetrical arrangements with the cemented lenses CL3 and CL4 (which have symmetrical lens combinations) disposed so as to sandwich the positive meniscus lenses L33 and L41 that also have symmetrical forms. This lens arrangement is effective in correcting various types of aberration. By using these elements, the zoom lens system 10 has a high magnification ratio of seven, an extremely wide angle of field of 90° to 16.2°, and is able to favorably correct various types of aberration. Accordingly, by using the zoom lens system 10, it is possible to form sharp images on the image pickup device 2 in various conditions and the resulting image data can be used for a variety of purposes.

Figure 3:
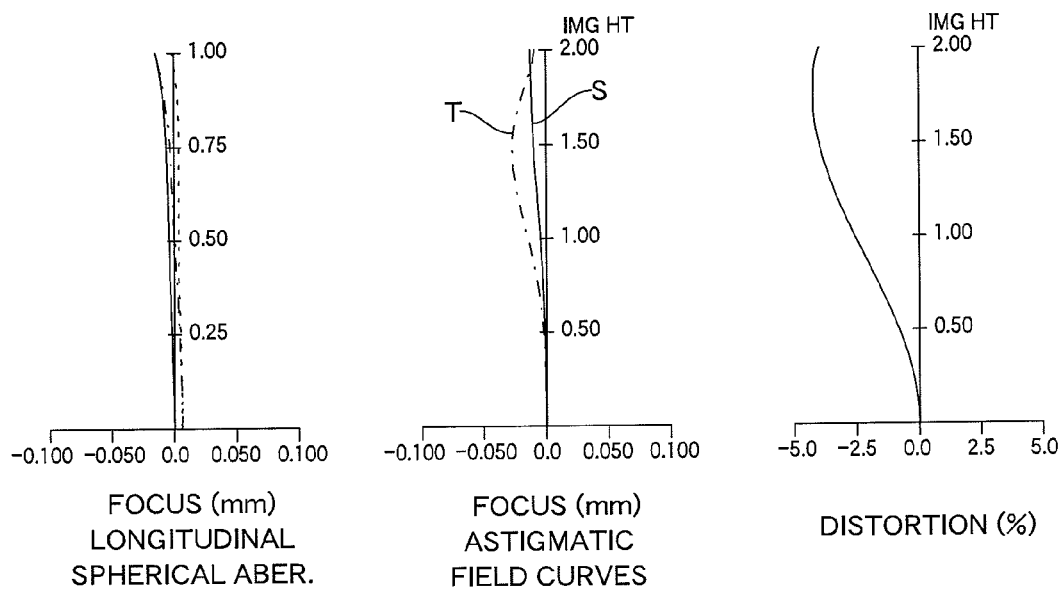
FIG. 3 shows various lateral aberrations at the wide-angle end.
Figure 4:
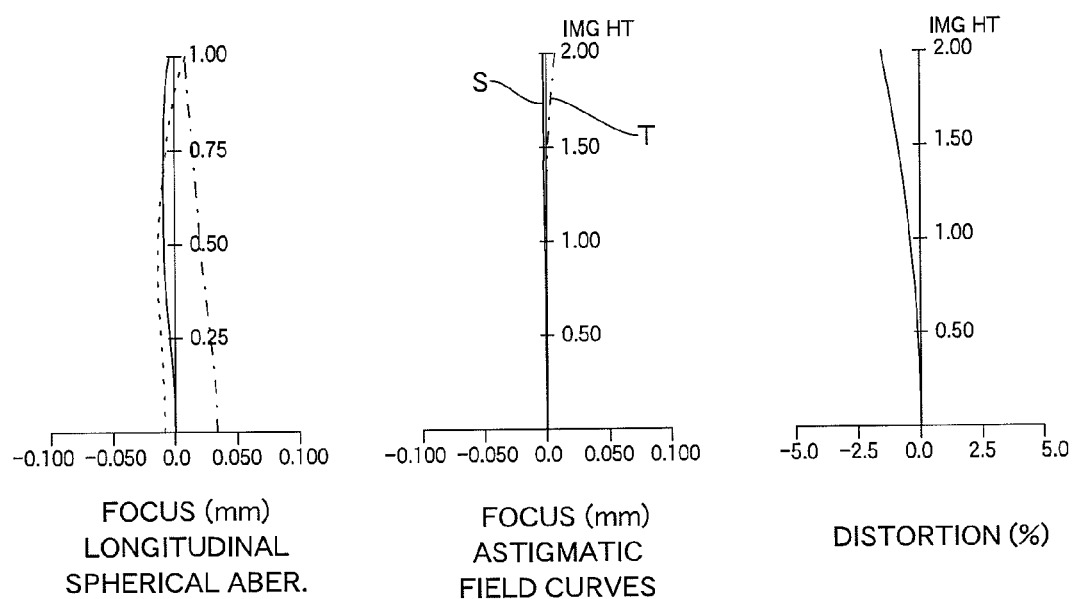
FIG. 4 shows various lateral aberrations at the telephoto end.

FIG. 3 shows the spherical aberration, astigmatism, and distortion of the zoom lens system 10 at the wide-angle end. FIG. 4 shows the spherical aberration, astigmatism, and distortion of the zoom lens system 10 at the telephoto end. Values of the spherical aberration for the respective wavelengths of 656 nm (broken line), 546 nm (solid line), and 486 nm (dot-dash line) are shown. In addition, in the graphs showing the astigmatism, the aberration for tangential rays (T) and sagittal rays (S) is shown. As shown in FIGS. 3 and 4, the various types of aberration are favorably corrected, so that sharp images can be projected.

As is shown in the above, the zoom lens system included in this invention can have an extremely wide angle of field, such as 90° at the wide angle end and around 16° at the telephoto end, and also has a high magnification ratio of seven. Accordingly, the zoom lens system included in this invention is appropriate as the lens system of a digital video camera for video conferencing and other system requiring higher wide angle and higher zooming ration, such as monitoring, supervising and security system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A zoom lens system comprising, in order from an object side thereof:
   a first lens group that has positive refractive power;
   a second lens group that has negative refractive power;
   a third lens group that has positive refractive power;
   a fourth lens group that has positive refractive power; and
   a fifth lens group that has positive refractive power,
   wherein the third lens group consists, in order from the object side, of a first positive lens, a negative lens, and a second positive lens, the first positive lens and the negative lens composing a cemented lens,
   the fourth lens group consists, in order from the object side, of a first positive lens, a negative lens, and a second positive lens, the negative lens and the second positive lens composing a cemented lens,
   zooming between a wide-angle end and a telephoto end is carried out without moving the first lens group and the fifth lens group, and
   focusing is carried out by moving the fifth lens group.

2. The zoom lens system according to claim 1, wherein, when zooming from the wide-angle end to the telephoto end, the second lens group moves from the object side toward an image forming side, the third lens group moves from the image forming side toward the object side, and the fourth lens group moves from the image forming side toward the object side.

3. The zoom lens system according to claim 1, wherein the second lens group includes a negative meniscus lens that is convex on the object side, the object side surface of the negative meniscus lens being aspherical and having a positive power that increases from an optical axis toward a periphery of the object side surface.

4. The zoom lens system according to claim 1, wherein the second positive lens of the third lens group is a positive meniscus lens that is concave on the object side, the object side surface of the positive meniscus lens being aspherical and having a negative power that increases from an optical axis toward the periphery of the object side surface.

5. The zoom lens system according to claim 1, wherein a combined focal length f2 of the second lens group and a combined focal length fw of the zoom lens system at the wide-angle end satisfy the following condition $2<|f2/fw|<4$.

6. A camera comprising:
the zoom lens system according to claim 1; and
an image pickup device disposed on an image forming side of the zoom lens system.

* * * * *